United States Patent
Chang-Chian et al.

(10) Patent No.: US 10,515,576 B2
(45) Date of Patent: *Dec. 24, 2019

(54) DATA TRANSMISSION METHOD AND DISPLAY DRIVING SYSTEM

(75) Inventors: Po-Chuan Chang-Chian, Hsinchu (TW); Chun-Yi Chou, Hsinchu (TW); Wing-Kai Tang, Hsinchu (TW); Ching-Chun Lin, New Taipei (TW); Chih-Wei Tang, Baisha Township, Penghu County (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,018

(22) Filed: Apr. 19, 2012

(65) Prior Publication Data

US 2013/0044088 A1    Feb. 21, 2013

(30) Foreign Application Priority Data

Aug. 19, 2011   (TW) .............................. 100129803 A

(51) Int. Cl.
*G09G 3/20*     (2006.01)
*G06F 3/14*     (2006.01)

(52) U.S. Cl.
CPC .............. *G09G 3/20* (2013.01); *G06F 3/1431* (2013.01); *G09G 2370/08* (2013.01); *G09G 2370/10* (2013.01)

(58) Field of Classification Search
CPC .......... G06F 13/00; G06F 3/14; G06F 3/1431; G09G 2360/04; G09G 2360/12;

(Continued)

(56) References Cited

U.S. PATENT DOCUMENTS 6,078,318 A * 6/2000 Mori ........................ G09G 3/20
                                                          345/204
7,800,622 B2 * 9/2010 Schindler et al. ............ 345/538
                                (Continued)

FOREIGN PATENT DOCUMENTS

CN       201608820 U      10/2010
CN       101937325 A      1/2011
TW       200710781 A      3/2007

OTHER PUBLICATIONS

Chinese Office Action dated Nov. 4, 2014.
(Continued)

*Primary Examiner* — Kent W Chang
*Assistant Examiner* — Sujit Shah
(74) *Attorney, Agent, or Firm* — JCIPRNET

(57) ABSTRACT

A data transmission method applied in a display, which includes a display panel, is provided. The data transmission method includes the following steps of: providing a host controller and n display drivers, n is a natural number greater than 1; providing a communication link under mobile industry processor interface (MIPI), connecting the host controller to the n display drivers; determining n virtual channel values Vc1-Vcn corresponding to the respective n display drivers; employing the host controller for providing a command with a virtual channel parameter through the communication link under MIPI; when the virtual channel parameter corresponds to an $i^{th}$ virtual channel values Vci, an $i^{th}$ display driver executing corresponding operations in response to the command, while the rest n−1 display drivers ignoring the command, wherein i is a natural number smaller than or equal to n.

22 Claims, 6 Drawing Sheets

(58) Field of Classification Search
CPC ........ G09G 5/00; G09G 3/20; G09G 2370/08; G09G 2370/10; H04M 1/00
USPC .................................................. 345/204, 699
See application file for complete search history.

(56) References Cited

U.S. PATENT DOCUMENTS

| | | | | |
|---|---|---|---|---|
| 7,995,003 | B1* | 8/2011 | Diard et al. | 345/1.3 |
| 8,537,166 | B1* | 9/2013 | Diard et al. | 345/502 |
| 2005/0116960 | A1* | 6/2005 | Shioda | G09G 5/393 |
| | | | | 345/545 |
| 2007/0063960 | A1 | 3/2007 | Iida et al. | |
| 2007/0165710 | A1* | 7/2007 | Alameh | H04L 25/0286 |
| | | | | 375/220 |
| 2007/0285428 | A1* | 12/2007 | Foster et al. | 345/503 |
| 2008/0174540 | A1* | 7/2008 | Lee | G09G 5/395 |
| | | | | 345/99 |
| 2008/0234005 | A1* | 9/2008 | Schindler | G09G 5/395 |
| | | | | 455/566 |
| 2009/0033650 | A1* | 2/2009 | Takeda | 345/214 |
| 2010/0039410 | A1 | 2/2010 | Becker et al. | |
| 2010/0309173 | A1* | 12/2010 | Matsuda | G09G 3/3674 |
| | | | | 345/204 |
| 2010/0315406 | A1* | 12/2010 | Nose et al. | 345/212 |
| 2011/0156936 | A1* | 6/2011 | Kim | H04L 25/14 |
| | | | | 341/100 |
| 2011/0157193 | A1* | 6/2011 | Boucher et al. | 345/505 |
| 2011/0157256 | A1* | 6/2011 | Sakamoto | G09G 3/344 |
| | | | | 345/690 |
| 2011/0242120 | A1* | 10/2011 | Akai | G09G 3/3406 |
| | | | | 345/531 |
| 2012/0110215 | A1* | 5/2012 | Tai | G06F 1/3206 |
| | | | | 710/14 |
| 2012/0242628 | A1* | 9/2012 | Yuan | G09G 3/20 |
| | | | | 345/204 |
| 2013/0044089 | A1* | 2/2013 | Chang-Chian et al. | 345/204 |

OTHER PUBLICATIONS

Office Action issued by USPTO dated Jun. 5, 2014 for U.S. Appl. No. 13/492,212.
U.S. Office Action dated Feb. 13, 2015 for U.S. Appl. No. 13/492,212.
Chinese Office Action dated Jul. 17, 2015.
USPTO Office Action dated Jul. 30, 2015, in a related U.S. Appl. No. 13/492,212.

* cited by examiner

DATA TRANSMISSION METHOD AND DISPLAY DRIVING SYSTEM

This application claims the benefit of Taiwan application Serial No. 100129803, filed Aug. 19, 2011, the subject matter of which is incorporated herein by reference.

BACKGROUND OF THE INVENTION

Field of the Invention

The invention relates in general to a data transmission method and display driving system using the same, and more particularly to a data transmission method and display driving system applied on a communication link under mobile industry processor interface (MIPI).

Description of the Related Art

In the present age, small-sized or medium-sized display have been widely applied in various kind of electronic products, such as mobile phones, personal digital assistants (PDA), multi-media players, GPS navigation devices, and so forth. Generally, a single display driver is employed in small or medium sized displays for achieving scan driving and data driving operation of the display panel.

However, drawbacks, such as the limited data channel numbers and the incapability for supporting display panels with higher resolution due to the limited size of the driver IC, rises in displays employing the present solution of a single display driver. As such, how to provide a display driving system capable of supporting more data channel numbers and display panel with higher resolution has became a prominent object for the industries.

SUMMARY OF THE INVENTION

The invention is directed to a data transmission method and a display driving system using the same, wherein multiple display drivers, each of which is configured with a virtual channel value, have been applied in the data transmission method and the display driving system for driving a display panel. The data transmission method and the display driving system directed to by the invention further employ a host controller for providing a command, with virtual channel address capability, under mobile industry processor interface (MIPI), so as to address and accordingly drive the multiple display drivers. Thus, in comparison to conventional display driving solution employing a single display driver, the data transmission method and display driving system using the same, directed to by the invention, are advantageously capable of supporting higher amount of data driving channels and display panels with higher resolution.

According to a first aspect of the present invention, a data transmission method, applied in a display having a host controller and n display drivers, wherein n is a natural number greater than 1. The data transmission method includes the steps of: providing a communication link under mobile industry processor interface (MIPI) between the host controller and the n display drivers; determining n virtual channel values Vc1, Vc2, . . . , and Vcn corresponding to the respective n display drivers; receiving a control command via the communication link under MIPI from the host controller, wherein the control command comprises a virtual channel parameter; an $i^{th}$ display driver among the n display drivers operating according to the control command when the virtual channel parameter of the control command indicates an $i^{th}$ virtual channel values Vci among the n virtual channel values, wherein i is a natural number smaller than or equal to n; and the rest n−1 display drivers among the n display drivers discarding the control command when the virtual channel parameter of the control command indicates the $i^{th}$ virtual channel values Vci.

According to a second aspect of the invention, a display driving system, applied in a display with a display panel, is provided. The display driving system includes a host controller and n display drivers, wherein n is a natural number greater than 1. The host controller provides a control command via a communication link under mobile industry processor interface (MIPI), wherein the control command comprises a virtual channel parameter. The n display drivers correspond to n respective virtual channel values Vc1, Vc2, . . . , and Vcn. An $i^{th}$ display driver among the n display drivers operates according to the control command when the virtual channel parameter of the control command indicates an $i^{th}$ virtual channel values Vci among the n virtual channel values, wherein i is a natural number smaller than or equal to n. The rest n−1 display drivers among the n display drivers discarding the control command when the virtual channel parameter of the control command indicates the $i^{th}$ virtual channel values Vci.

The invention will become apparent from the following detailed description of the preferred but non-limiting embodiments. The following description is made with reference to the accompanying drawings.

DETAILED DESCRIPTION OF THE INVENTION

The display driving system according to the present embodiment of the invention employs multiple display drivers for driving a display panel, wherein each of the display drivers is configured with a virtual channel value for the purpose of addressing.

Figure 1:
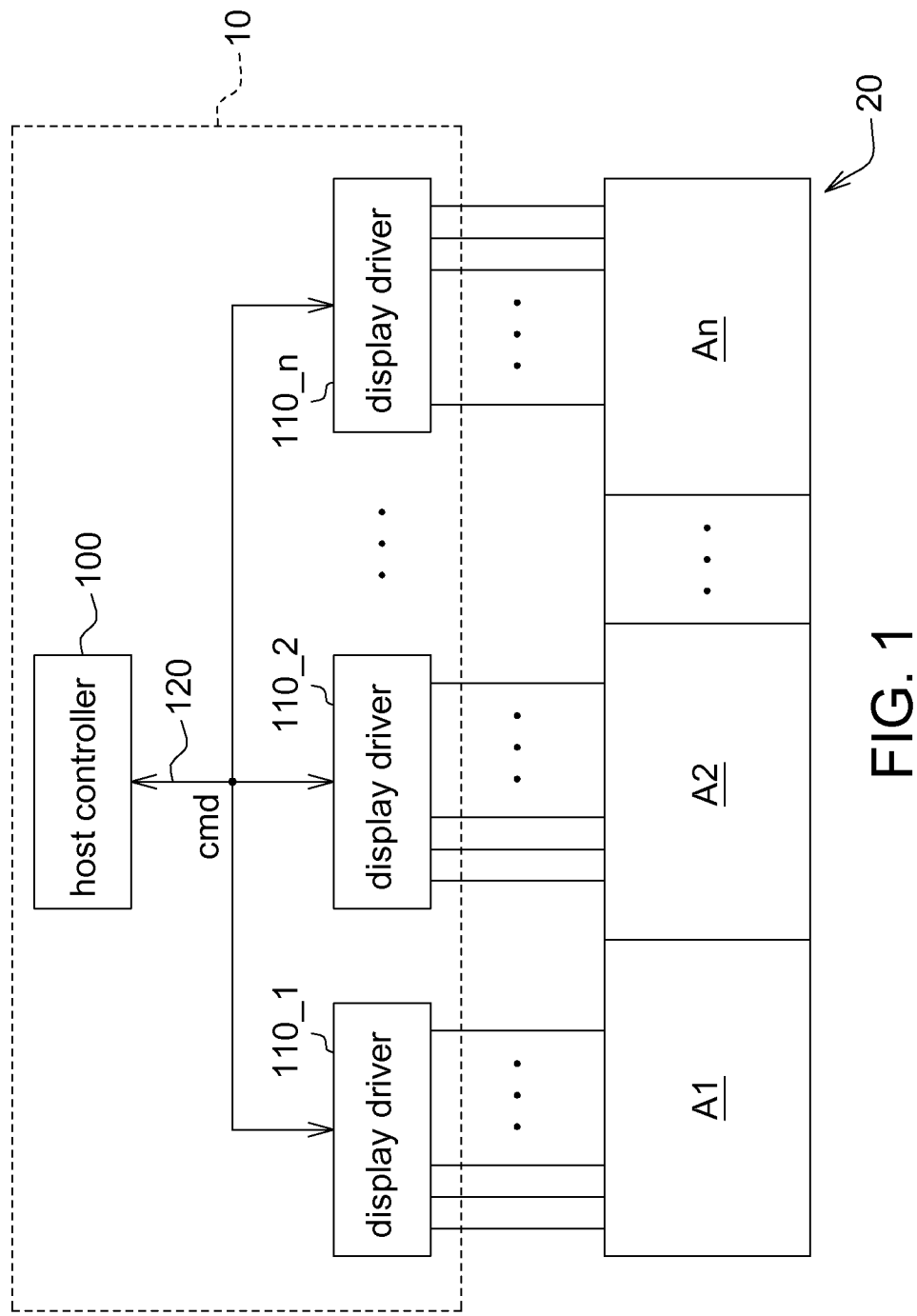
FIG. 1 is a block diagram of a display driving system of a display according to an embodiment of the invention.

Referring to FIG. 1, a block diagram of a display employing a display driving system according to an embodiment of the invention is shown. The display 1 includes a display driving system 10 and a display panel 20. For example, the display panel 20 includes n panel regions A1, A2, . . . , and An, each of which corresponds to a same area and resolution, wherein n is a natural number greater than 1. In an example, n is equal to 3 and the display panel corresponds to a resolution of 1920 by 1080, so that each of the n panel regions A1 to A3 corresponds to a resolution of 640 by 1080.

The display driving system 10 includes a host controller 100 and n display drivers 110_1, 110_2, ..., and 110_n. The host controller 110 includes a host controller 100 and n display drivers 110_1, 110_2, ..., and 110_n. The host controller 100 provides a control command cmd via a communication link under mobile industry processor interface (MIPI) 120, wherein the control command cmd comprises a virtual channel parameter. For example, the control command cmd is defined in a display command set (DCS), such as a data transmission request command, a read request command, an indication command of a tearing effect event, an address configuration command for a random access memory, or a data write command.

The n display drivers 110_1 to 110_n respectively determine n virtual channel values Vc1, Vc2, ..., and Vcn. In an example, n is equal to 3, and the virtual channel values Vc1 to Vc3 respectively correspond to values of 1, 2, and 3.

When the virtual channel parameter of the control command cmd corresponds to an $i^{th}$ virtual channel value Vci among the n virtual channel values Vc1 to Vcn, the display driver 110_i, corresponding to the $i^{th}$ virtual channel value Vci, operates in response to the control command cmd, while the rest n−1 display drivers accordingly discard the control command cmd, wherein i is a natural number smaller than or equal to n. As such, the display driving system 10 according to the present embodiment of the invention is capable of addressing the control command cmd, provided via the communication link under MIPI 120, by means of configuring the aforementioned virtual channel parameter, so as to have the n display drivers 110_1 to 110_n properly driven.

In the following paragraphs, examples are cited for more clearly having varies operations, achieved with the control command cmd, illustrated.

Data Transmission Request Command and Read Request Command

In a practical example, the control command cmd is a data transmission command or a read request command. As such, the display driver 110_i sends a confirmation signal in response to the data transmission request command, so as to have the host controller 100 noticed whether a data transmission operation indicated by the data transmission request command is achieved. For example, the operation sequence that the host controller 100 provides the data transmission command and the display driver 110_i accordingly responds with the confirmation signal is illustrated in FIG. 2.

Figure 2:
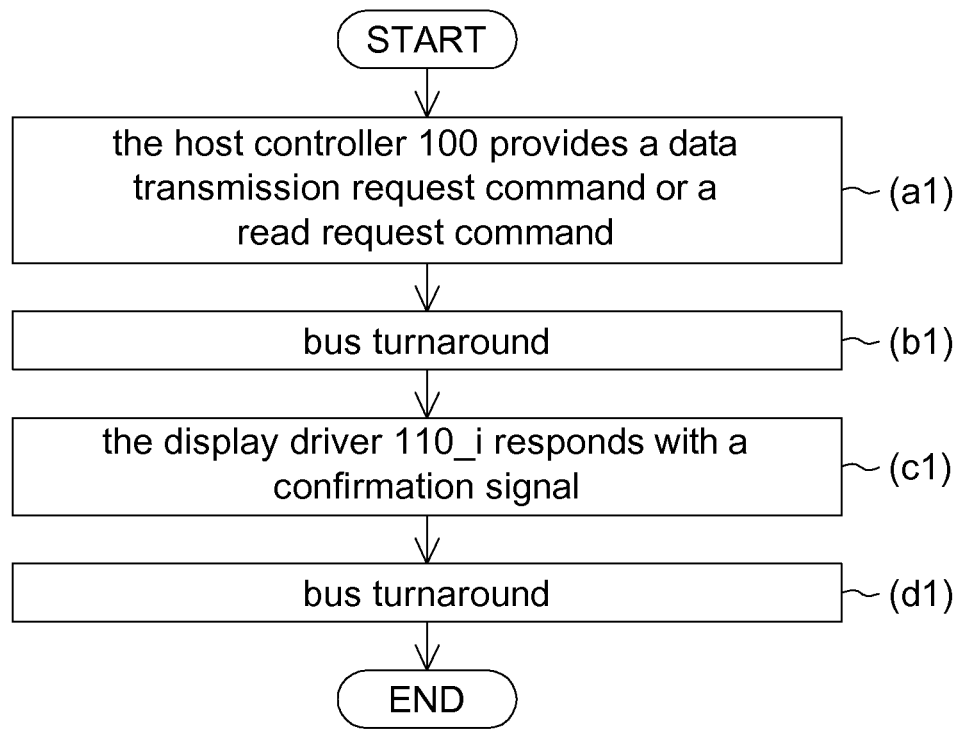
FIG. 2 is a flow chart of the display driving system according to the present embodiment of the invention when the control command cmd is a data transmission request command.

More specifically, the sequence, illustrated in FIG. 2, firstly proceeds to step (a1), in which the host controller 100 provides the data transmission request command, and the virtual channel parameter provided with the data transmission request command indicates the virtual channel value Vci. Next, the sequence proceeds to step (b1), in which the host controller 100 and the display driver 110_i enter a bus turnaround period, wherein the master position of the communication link under MIPI 120, currently taken by the host controller 100, is switched to the display driver 110_. The sequence then proceeds to step (c1), in which the display driver 110_i sends the confirmation signal to the host controller 100 via the communication link under MIPI 120. After that, the sequence proceeds to step (d1), in which the host controller 100 and the display driver 110_i enter the bus turnaround period once again, so that the master position of the communication link under MIPI 120, currently taken by the display driver 110_i, is switched back to the host controller 100.

Indication Command of a Tearing Effect Event

In another practical example, the control command cmd is an indication command of a tearing effect event, and the virtual channel parameter accordingly corresponds to the virtual channel value Vc1 among the n virtual channel values Vc1 to Vcn. As such, the display driving system 10 could achieve indication and response of the tearing effect event via the first display driver 110_1.

The display driver 110_1 sends a confirmation signal, indicating whether the host controller 100 is able to provide display data corresponding to a next frame, in response to the indication command of the tearing effect event. For example, the operation sequence that the host controller 100 provides the indication command of the tearing effect event and the display driver 110_1 accordingly responds with the confirmation signal is illustrated in FIG. 3.

Figure 3:
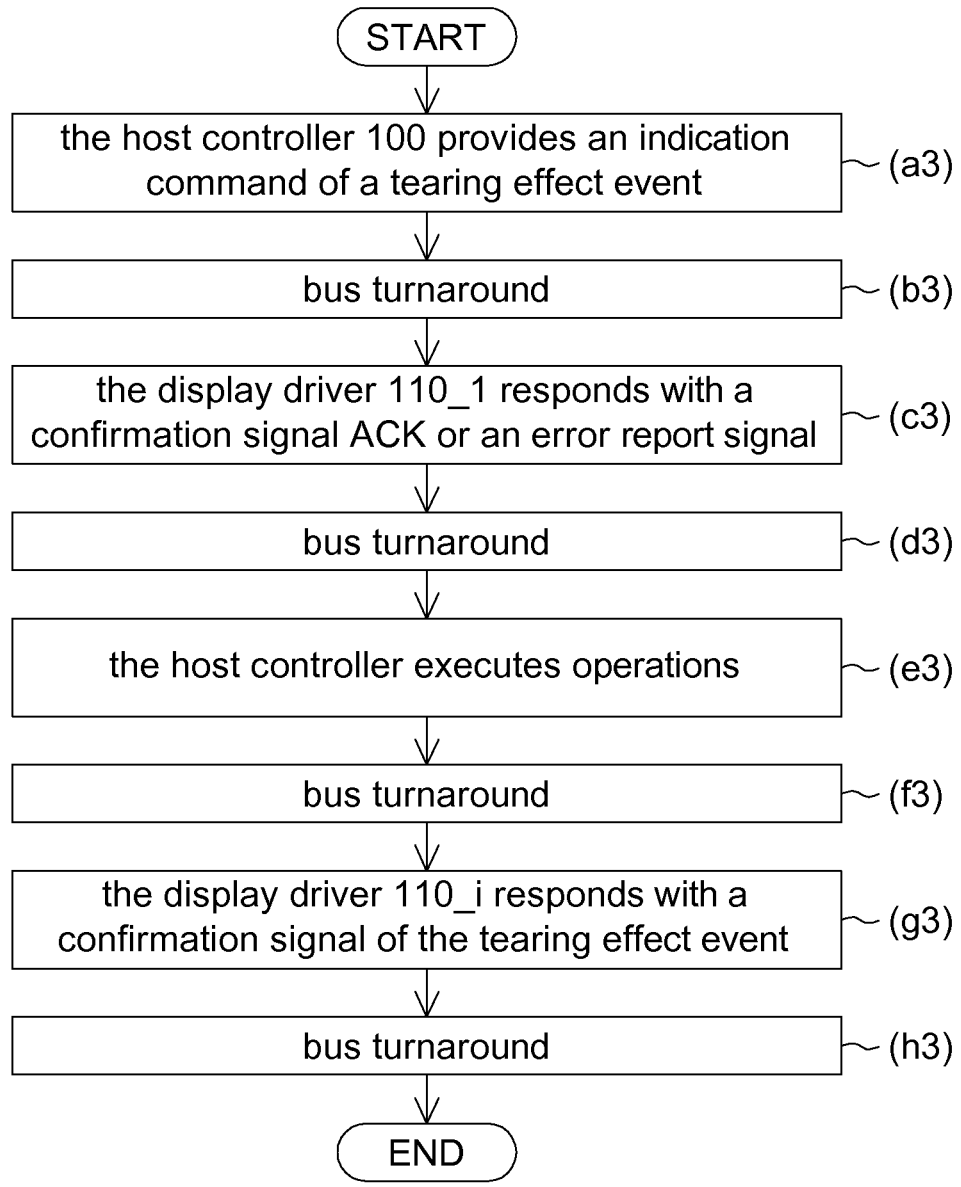
FIG. 3 is a flow chart of the display driving system according to the present embodiment of the invention when the control command cmd is an indication command of a tearing effect event.

More specifically, the sequence, illustrated in FIG. 3, firstly proceeds to step (a3), in which the host controller 100 provides the indication command of the tearing effect event, and the virtual channel parameter of the indication command indicates the virtual channel value Vc1. The sequence next proceeds to step (b3), in which the host controller 100 and the display driver 110_1 enter a bus turnaround period, wherein the master position of the communication link under MIPI 120, currently taken by the host controller 100, is switched to the display driver 110_1. The sequence then proceeds to step (c3), in which the display driver 110_1 sends a confirmation signal ACK or an error report signal to the host controller 100 via the communication link under MIPI 120. After that, the sequence proceeds to step (d3), in which the host controller 100 and the display driver 110_1 enter the bus turnaround period once again, so that the master position of the communication link under MIPI 120, currently taken by the display driver 110_1, is switched back to the host controller 100.

The sequence next proceeds to steps (e3), (f3), (g3), and (h3), wherein steps (e3), (f3), and (h3), with the control operation of the host controller 100, the master position of the communication link under MIPI 120 switched to the display driver 110_1, and then switched back to the host controller 100, are respectively similar to steps (a3), (b3), and (d3). In step (g3), the display driver 110_1 provides and sends a confirmation signal of the tearing effect event back to the host controller 100.

Address Configuration Command for a Random Access Memory and Data Write Command

In still another practical example, the control command cmd is an address configuration command for the RAM or a data write command. For example, each of the display drivers 110_1 to 110_n includes a RAM (not shown), and the $i^{th}$ display driver 110_i having data storage space of its RAM configured in response to the address configuration command, and having data written into the data storage space in response to the data write command. For example, the aforementioned address configuration of memory is executed under a command mode of the MIPI by the host controller 100 and the display driver 110_i, so as to achieve data transmission of the display data.

Figure 4:
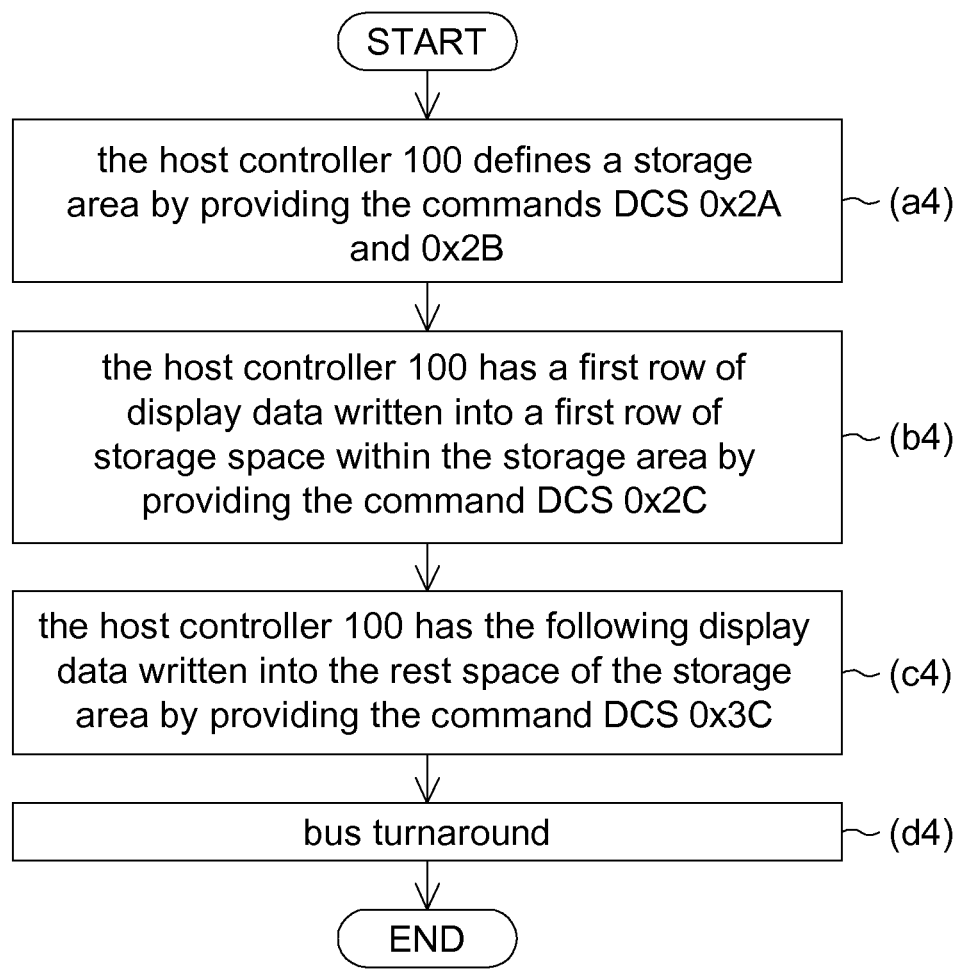
FIG. 4 is a flow chart of the display driving system according to the present embodiment of the invention when the control command cmd is an address configuration command of a random access memory and a data write command.

For example, the address configuration command for the RAM is defined in the DCS as commands 0x2A and 0x2B, and the data write command is defined in the DCS as commands 0x2C and 0x3C. The operation sequence that the host controller 100 provides the address configuration command for the RAM and the data write command is illustrated in FIG. 4.

The sequence firstly proceeds to step (a4), in which the host controller 100 provides the address configuration commands DCS 0x2A and 0x2B for defining a storage area within the RAM of the display driver 110_i, wherein the commands DCS 0x2A and 0x2B respectively having an initial address and a terminal address of the storage area determined. The sequence next proceeds to step (b4), in which the host controller 100 provides the data write command DCS 0x2C for having a first row of display data written into a first row of storage space within the storage area. The sequence then proceeds to step (c4), in which the host controller 100 provides the data write command DCS 0x3C for having the following display data written into the rest space of the storage area. After that, the sequence proceeds to step (d4), in which the host controller 100 and the display driver 110_i once again enter the bus turnaround period.

System Idle State

Figure 5:
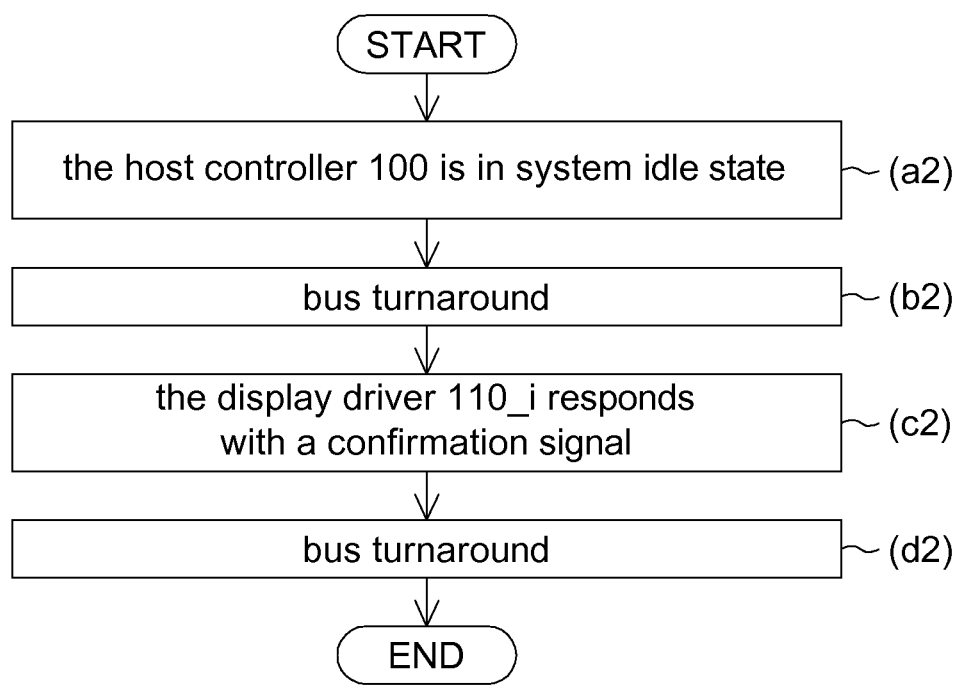
FIG. 5 is a flow chart of the display driving system according to the present embodiment of the invention when the host controller 100 operates in a system idle state.

In a practical example, the host controller 100 operates in a system idle state, in which, for example, the display 1 is turned on and no command has ever been provided. In the present situation, the display driver 110_i sends a confirmation signal, wherein the parameter i could be any initial value preset in the system. The host controller 100, for example, determines whether the communication link under MIPI 120 operates normally according to the confirmation signal sent by the display driver 110_i. For example, the operation sequence that the display driver 110_i sends the confirmation signal under the system idle condition is illustrated in FIG. 5, wherein steps (a2) to (d2) are respectively similar to steps (a1) to (d1) illustrated in FIG. 2, and the detail description is accordingly omitted for conciseness.

Though only the situation that the virtual channel parameter of the control command cmd is selectively corresponding to each of the virtual channel values Vc1 to Vcn is illustrated in the present embodiment, the control command cmd is not limited thereto. In other example, the virtual channel parameter of the control command cmd could correspond to other values, so as to have the display drivers 110_1 to 110_n controlled for other operation. For example, the n display drivers 110_1 to 110_n are further configured with a virtual broadcasting value Vcb, and the virtual channel parameter of the control command cmd could also correspond to the virtual broadcasting value Vcb for achieving broadcasting operation on all of the display drivers 110_1 to 110_n.

For example, when the virtual channel value of the control command cmd corresponds to the virtual broadcasting value Vcb, the n display drivers 110_1 to 110_n are all enabled and operate according to the control command cmd. As such, broadcasting operation among the n display drivers 110_1 to 110_n by the host controller 110 can be implemented.

Figure 6:
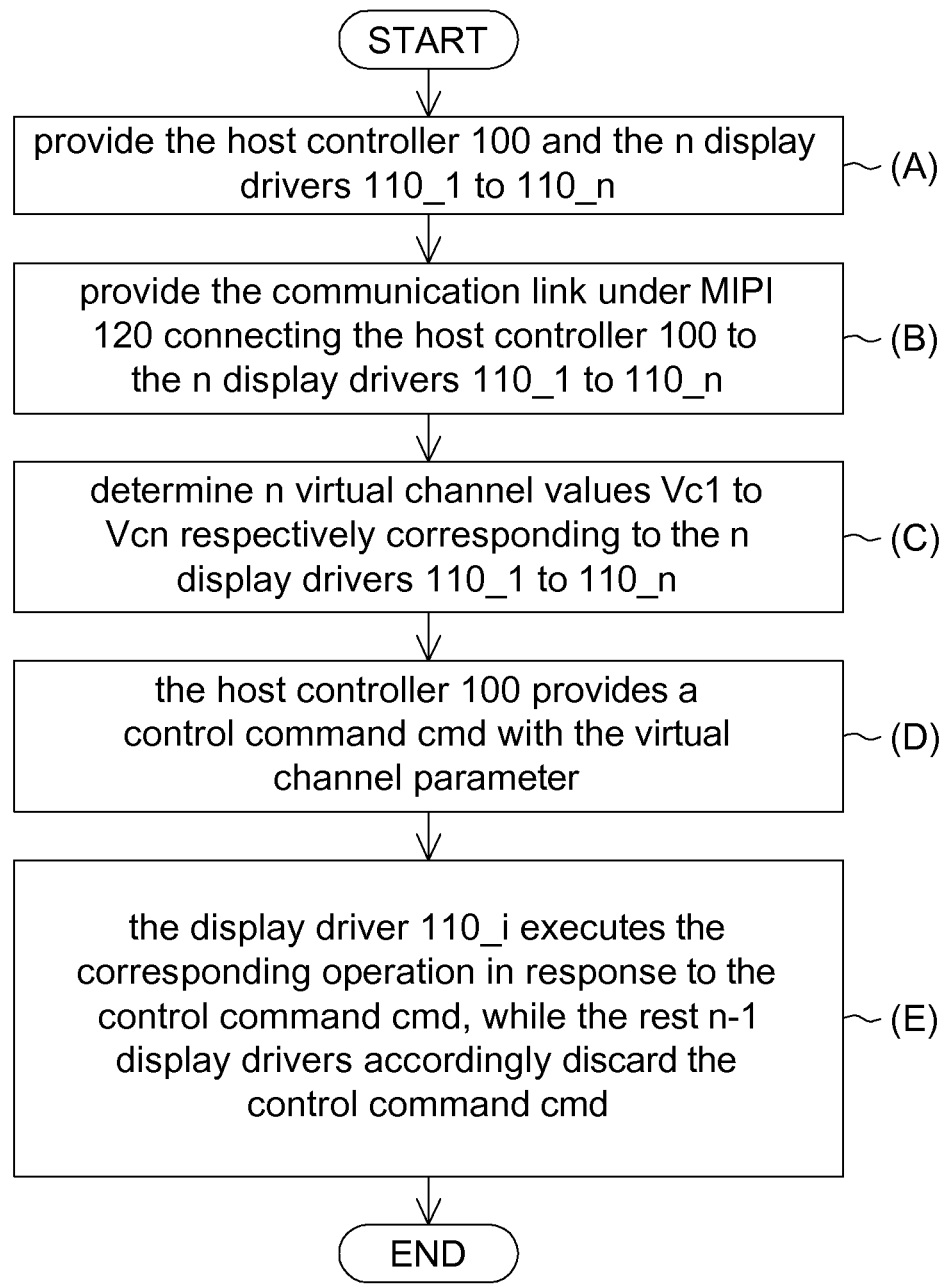
FIG. 6 is a flow chart of the data transmission method according to the present embodiment of the invention.

Referring to FIG. 6, a flow of the data transmission method according of the present embodiment is shown. For example, the data transmission method according to the present embodiment of the invention includes the following steps. Firstly, the data transmission method proceeds to step (A), in which the host controller 100 and the n display drivers 110_1 to 110_n is provided. The data transmission method next proceeds to step (B), in which the communication link under MIPI 120 is provided for connecting the host controller 100 to the n display drivers 110_1 to 110_n. The data transmission method then proceeds to step (C), in which n virtual channel values Vc1 to Vcn respectively corresponding to the n display drivers 110_1 to 110_n are determined. The data transmission method next proceeds to step (D), in which the host controller 100 provides a control command cmd with the virtual channel parameter via the communication link under MIPI 120. When the virtual channel parameter of the control command cmd indicates the virtual channel value Vci, the data transmission method proceeds to step (E), in which the display driver 110_i executes the corresponding operation in response to the control command cmd, while the rest n−1 display drivers accordingly discard the control command cmd.

The data transmission method and the display driving system according to the present embodiment of the invention employ multiple display drivers, each of which is configured with a virtual channel value, for driving a display panel. The data transmission method and the display driving system according to the present embodiment of the invention further employ a host controller for providing a command, with virtual channel address capability, under MIPI, so as to address and accordingly drive the multiple display drivers. Thus, in comparison to conventional display driving solution employing a single display driver, the data transmission method and display driving system according to the present embodiment of the invention are advantageously capable of supporting higher amount of data driving channels and display panels with higher resolution.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission method applied in a display, the display comprising a display driving system and a single display panel, the display driving system having a host controller and n display drivers, wherein the n display drivers are for driving the single display panel having n panel regions, each of the panel regions respectively configured to be coupled to and driven by a corresponding one of the n display drivers, and n is a natural number greater than 1, the data transmission method comprising:
   providing a communication link under mobile industry processor interface (MIPI) between the host controller and the n display drivers;
   determining n virtual channel values Vc1, Vc2, . . . , and Vcn corresponding to the respective n display drivers;
   receiving a control command via the communication link under MIPI from the host controller, wherein the control command comprises a virtual channel parameter;
   configuring an $i^{th}$ display driver among the n display drivers to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n;
   configuring the remaining n−1 display drivers among the n display drivers to disregard the control command when the virtual channel parameter of the control command indicates the $i^{th}$ virtual channel value Vci; and
   configuring the n display drivers with a virtual broadcasting value, wherein the virtual channel parameter of the control command further corresponds to the virtual broadcasting value for achieving broadcasting operation on all of the n display drivers;
   wherein the virtual channel parameter of the control command corresponds to a first virtual channel value Vc1 among the n virtual channel values when the control command corresponds to an indication command of a tearing effect event.

2. The data transmission method according to claim 1, further comprising:
determining the virtual broadcasting value; and
the n display drivers operating according to the control command when the virtual channel parameter of the control command indicates the virtual broadcasting value.

3. The data transmission method according to claim 1, wherein the control command corresponds to a data transmission request command, and the $i^{th}$ display driver sends a response confirmation signal, capable of having the host controller noticed whether a data transmission operation indicated by the data transmission request command is achieved, in response to the data transmission request command.

4. The data transmission method according to claim 1, wherein the control command corresponds to a read request command, and the $i^{th}$ display driver sends a response confirmation signal, capable of having the host controller noticed whether a data transmission operation indicated by the read request command is achieved, in response to the read request command.

5. The data transmission method according to claim 1, wherein when the host controller is in a system idle state, the $i^{th}$ display driver sends a response confirmation signal.

6. The data transmission method according to claim 1, wherein the control command corresponds to an address configuration command for a random access memory (RAM), wherein,
the $i^{th}$ display driver comprises a RAM, and the $i^{th}$ display driver has the RAM configured with a data storage space in response to the address configuration command.

7. The data transmission method according to claim 6, wherein the control command further corresponds to a data write command, and the $i^{th}$ display driver has transmission data provided by the host controller written into the data storage space in response to the data write command.

8. The data transmission method according to claim 1, wherein the control command corresponds to a command defined in a display command set.

9. The data transmission method according to claim 1, wherein the control command corresponds to an indication command of a tearing effect event, and the $i^{th}$ display driver sends a response confirmation signal, capable of providing notice to the host controller as to whether to provide display data corresponding to a next frame, in response to the indication command.

10. A display driving system applied in a display, the display comprising the display driving system and a single display panel, the display driving system comprising:
a host controller, providing a control command via a communication link under mobile industry processor interface (MIPI), wherein the control command comprises a virtual channel parameter; and
n display drivers for driving the single display panel having n panel regions, each of the panel regions respectively being coupled to and driven by a corresponding one of the n display drivers, corresponding to n respective virtual channel values Vc1, Vc2, . . . , and Vcn, wherein n is a natural number greater than 1, wherein,
an $i^{th}$ display driver among the n display drivers configured to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n; and
the remaining n−1 display drivers among the n display drivers configured to disregard the control command when the virtual channel parameter of the control command indicates the $i^{th}$ virtual channel value Vci;
wherein the n display drivers are further configured with a virtual broadcasting value, and the virtual channel parameter of the control command further corresponds to the virtual broadcasting value for achieving broadcasting operation on all of the display drivers;
wherein the virtual channel parameter of the control command corresponds to a first virtual channel value Vc1 among the n virtual channel values when the control command corresponds to an indication command of a tearing effect event.

11. The display driving system according to claim 10, wherein the n display drivers operate according to control command when the virtual channel parameter of the control command indicates the virtual broadcasting value.

12. The display driving system according to claim 10, wherein the control command corresponds to a data transmission request command, and the $i^{th}$ display driver sends a response confirmation signal, capable of having the host controller noticed whether a data transmission operation indicated by the data transmission request command is achieved, in response to the data transmission request command.

13. The display driving system according to claim 10, wherein the control command corresponds to a read request command, and the $i^{th}$ display driver sends a response confirmation signal, capable of having the host controller noticed whether a data transmission operation indicated by the read request command is achieved, in response to the read request command.

14. The display driving system according to claim 10, wherein when the host controller is in a system idle state, the $i^{th}$ display driver sends a response confirmation signal.

15. The display driving method according to claim 10, wherein the control command corresponds to an address configuration command for a random access memory (RAM), the $i^{th}$ display driver comprises a RAM, and the $i^{th}$ display driver has the RAM configured with a data storage space in response to the address configuration command.

16. The display driving system according to claim 15, wherein the control command further corresponds to a data write command, and the $i^{th}$ display driver has transmission data provided by the host controller written into the data storage space in response to the data write command.

17. The display driving system according to claim 10, wherein the control command corresponds to a command defined in a display command set.

18. The display driving system according to claim 10, wherein the control command corresponds to an indication command of a tearing effect event, and the $i^{th}$ display driver sends a response confirmation signal, capable of providing notice to the host controller as to whether to provide display data corresponding to a next frame, in response to the indication command.

19. A data transmission method applied in a display, the display comprising a display driving system and a single display panel, the display driving system having a host controller and n display drivers, wherein the n display drivers are for driving the single display panel having n panel regions, each of the panel regions respectively being coupled to and driven by a corresponding one of the n display drivers, and n is a natural number greater than 1, the data transmission method comprising:
- providing a communication link under mobile industry processor interface (MIPI) between the host controller and the n display drivers;
- determining n virtual channel values Vc1, Vc2, . . . , and Vcn corresponding to the respective n display drivers;
- receiving a control command via the communication link under MIPI from the host controller, wherein the control command comprises a virtual channel parameter;
- configuring an $i^{th}$ display driver among the n display drivers to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n; and
- configuring the remaining n−1 display drivers among the n display drivers to disregard the control command when the virtual channel parameter of the control command indicates the $i^{th}$ virtual channel value Vci;
- wherein after the step of receiving the control command via the communication link is performed, there is a first turnaround period in which a master position of the communication link under MIPI is switched from the host controller to the $i^{th}$ display driver, and there is a second turnaround period occurring after the first turnaround period, wherein in the second turnaround period the master position of the communication link under MIPI is switched from the $i^{th}$ display driver back to the host controller;
- wherein the virtual channel parameter of the control command corresponds to a first virtual channel value Vc1 among the n virtual channel values when the control command corresponds to an indication command of a tearing effect event.

20. A display driving system applied in a display, the display comprising the display driving system and a single display panel, the display driving system comprising:
- a host controller, providing a control command via a communication link under mobile industry processor interface (MIPI), wherein the control command comprises a virtual channel parameter; and
- n display drivers for driving the single display panel having n panel regions, each of the panel regions respectively being coupled to and driven by a corresponding one of the n display drivers, corresponding to n respective virtual channel values Vc1, Vc2, . . . , and Vcn, wherein n is a natural number greater than 1, wherein,
- an $i^{th}$ display driver among the n display drivers is configured to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n; and
- the remaining n−1 display drivers among the n display drivers are configured to disregard the control command when the virtual channel parameter of the control command indicates the $i^{th}$ virtual channel value Vci;
- wherein after the step of receiving the control command via the communication link is performed, there is a first turnaround period in which a master position of the communication link under MIPI is switched from the host controller to the $i^{th}$ display driver, and there is a second turnaround period occurring after the first turnaround period, wherein in the second turnaround period the master position of the communication link under MIPI is switched from the $i^{th}$ display driver back to the host controller;
- wherein the virtual channel parameter of the control command corresponds to a first virtual channel value Vc1 among the n virtual channel values when the control command corresponds to an indication command of a tearing effect event.

21. A data transmission method applied in a display, the display comprising a display driving system and a single display panel, the display driving system having a host controller and n display drivers, wherein the n display drivers are for driving the single display panel having n panel regions, each of the panel regions respectively being coupled to and driven by a corresponding one of the n display drivers, and n is a natural number greater than 1, the data transmission method comprising:
- providing a communication link under mobile industry processor interface (MIPI) between the host controller and the n display drivers;
- determining n virtual channel values Vc1, Vc2, . . . , and Vcn corresponding to the respective n display drivers;
- receiving a control command via the communication link under MIPI from the host controller, wherein the control command comprises a virtual channel parameter;
- configuring an $i^{th}$ display driver among the n display drivers to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n; and
- configuring the remaining n−1 display drivers among the n display drivers to disregard the control command when the virtual channel parameter of the control command indicates the $i^{th}$ virtual channel value Vci;
- wherein the virtual channel parameter of the control command corresponds to a first virtual channel value Vc1 among the n virtual channel values when the control command corresponds to an indication command of a tearing effect event.

22. A display driving system applied in a display, the display comprising the display driving system and a single display panel, the display driving system comprising:
- a host controller, providing a control command via a communication link under mobile industry processor interface (MIPI), wherein the control command comprises a virtual channel parameter; and
- n display drivers for driving the single display panel having n panel regions, each of the panel regions respectively being coupled to and driven by a corresponding one of the n display drivers, corresponding to n respective virtual channel values Vc1, Vc2, . . . , and Vcn, wherein n is a natural number greater than 1, wherein,
- an $i^{th}$ display driver among the n display drivers is configured to drive an $i^{th}$ panel region among the n panel regions according to the control command when the virtual channel parameter of the control command indicates an $i^{th}$ virtual channel value Vci among the n virtual channel values, wherein i is a natural number smaller than or equal to n; and
- the remaining n−1 display drivers among the n display drivers are configured to disregard the control command when the virtual channel parameter of the control command indicates the $i^{th}$ virtual channel value Vci;

wherein the virtual channel parameter of the control command corresponds to a first virtual channel value $Vc1$ among the n virtual channel values when the control command corresponds to an indication command of a tearing effect event.

* * * * *